(12) United States Patent
Gelfer (10) Patent No.: US 6,986,224 B2
(45) Date of Patent: Jan. 17, 2006

(54) PLANT WETTING METHOD AND APPARATUS

(76) Inventor: Aharon Gelfer, 52 Denya Str, P.O.Box 55067, 31054 Haifa (IL)

( * ) Notice: Subject to any disclaimer, the term of this patent is extended or adjusted under 35 U.S.C. 154(b) by 0 days.

(21) Appl. No.: 10/982,143

(22) Filed: Nov. 5, 2004

(65) Prior Publication Data

US 2005/0060934 A1    Mar. 24, 2005

Related U.S. Application Data (63) Continuation of application No. PCT/IL03/00366, filed on May 6, 2003.

(60) Provisional application No. 60/379,077, filed on May 9, 2002.

(51) Int. Cl.
*A01G 27/04*    (2006.01)
*A01G 9/02*    (2006.01)

(52) U.S. Cl. .......................................................... 47/81
(58) Field of Classification Search .................... 47/79, 47/80, 81
See application file for complete search history.

(56) References Cited

U.S. PATENT DOCUMENTS

| | | | |
|---|---|---|---|
| 1,216,642 A | | 2/1917 | White |
| 3,903,644 A | * | 9/1975 | Swift et al. ..................... 47/79 |
| 4,324,070 A | | 4/1982 | Swisher |
| 4,991,346 A | * | 2/1991 | Costa et al. .................... 47/80 |
| 5,042,197 A | * | 8/1991 | Pope .............................. 47/79 |
| 5,129,183 A | * | 7/1992 | Haw .............................. 47/81 |
| 5,136,806 A | * | 8/1992 | Kang ............................. 47/81 |
| 5,341,596 A | * | 8/1994 | Kao ............................... 47/79 |
| 5,446,994 A | * | 9/1995 | Chou ............................. 47/81 |
| 5,491,928 A | * | 2/1996 | Potochnik ...................... 47/79 |
| 5,535,542 A | | 7/1996 | Gardner et al. |
| 5,622,004 A | | 4/1997 | Gidge |
| 6,131,334 A | * | 10/2000 | Fan ............................... 47/81 |
| 6,289,632 B1 | * | 9/2001 | Boling .......................... 47/79 |

FOREIGN PATENT DOCUMENTS

| | | | |
|---|---|---|---|
| FR | 2576177 | * | 7/1986 |
| GB | 2233201 | | 1/1991 |
| JP | 2003-144283 | | 5/2003 |
| WO | WO 03/022038 | | 3/2003 |

* cited by examiner

*Primary Examiner*—Jeffrey L. Gellner
(74) *Attorney, Agent, or Firm*—Frishauf, Holtz, Goodman & Chick, P.C.

(57) ABSTRACT

A unitary rigid wetter is reversibly and releasably coupled by hand to the bottom of a plant pot that is then inserted into a reservoir filled with liquid. The length of the wetter is adjustable to fit pots and reservoirs that are available on the market. The wetter is appropriate for use by plant growers, by retailers, and by plant owners. Wetness is conveyed by the wetter from the liquid to a medium wherein a plant grows, via at least one lower wetness conductor retained in the interior the wetter. A wetness controller is adjustable to limit the amount of wetness conveyed, to match the type and the nature of the plant. Optionally, at least one upper wetness conveyor is available.

20 Claims, 3 Drawing Sheets

PLANT WETTING METHOD AND APPARATUS

This application is a CON of PCT/IL03/00366 May 6, 2003 which claims benefit of Ser. No. 60/379,077 May 9, 2002

TECHNICAL FIELD

The present invention relates in general to the watering of plants in pots and in particular, to a method and an apparatus for restricting plant attendance requirements, applicable along the potted plant life cycle ranging from the grower, via the retailer and ending with the plant owner.

GLOSSARY

The listed terms are used below according to the following definitions.
Pot: a container for growing a plant.
Liquid: Any liquid, natural, solution, or mixture able to grow and/or sustain the growth of a plant
Medium: soil, earth, compost, or any other appropriate plant growing medium.
Reservoir: a container of liquid.

BACKGROUND ART

Since the watering of plants in pots is a burden, self-watering devices of various kinds attempt to alleviate the continuous task of watering on a regular basis. One proposed solution is divulged in the PCT International Publication No. WO 01/35724 A, by A. Gelfer, describing a dedicated planter containing one or more pots, where watering liquid is conducted from containers of liquid via pipes to the plants in the pot(s). Although effective, that dedicated planter is rather complicated and expensive to build.

A self-watering planter is disclosed in U.S. Pat. No. 4,324,070 to Swisher, which " . . . comprises a water reservoir 3, an absorbent mat 5 disposed on a removable lid 7, and a separable plant container 9 containing growing media 11 . . . ". The reservoir is described as: "Water reservoir 3 includes . . . an open top portion 15 . . . An annular recessed area 17 is formed about the periphery of open top portion 15. Annular area 17 includes one or more watering openings 19 formed therein . . . ". Details of the lid state: "Lid 7 also includes an opening 23 formed therein for receiving a wick portion 25 of absorbent mat 5."

As to the plant container: "Plant container 9 includes a recessed base 29, . . . recessed by a downwardly extending rim 37 formed as part of the lower portion of side walls 31. One or more openings 39 are formed in base 29 . . . complementary to water-receiving openings 19 of water reservoir 3."

Swisher further explains: "When lid 7 and plant container 9 are assembled atop water reservoir 3, rim 37 of container 9 rests along an outer portion of recessed annular area 17."

According to the quotations listed above, the self-watering planter by Swisher suffers from several shortcomings. First, both the water reservoir 3 and the separable plant container 9 must be manufactured to description so as to match. Second, the separable plant container 9 assembled atop water reservoir 3 creates a tower of questionable stability, especially when used outdoors in windy conditions. Third, the invention is not applicable for use by a plant grower, who is at the origin of the potted plant life cycle.

U.S. Pat. No. 1,216,642 to White discloses "A vertical tube 10 fixed intermediate of its ends," with the upwardly projecting portion of the tube extending "into the earth within said pot", and " . . . a length of sponge (11) or other absorbent material extending through the tube 10 . . . " into the water, and " . . . also projects outwardly from the upper end of the tube 10 into the flower pot." Since the tube 10 is fixed it cannot be easily and reversibly removed or replaced. Furthermore, the amount of water absorbed by the sponge 11 and by capillary attraction cannot be dosed, regulated and controlled. Moreover, the sponge 11 extending into the earth will become clogged by the roots of the plant.

DISCLOSURE OF INVENTION

The present disclosure is related to the Provisional Application Ser. No. 60/379077 filed on 9 May 2002, (Sep. 5, 2002), the contents of which are incorporated herein in whole by reference.

Regular watering attendance of plants in pots is essential to sustain the plants alive along their whole life cycle. This life cycle is a chain of stations starting at a first station, where the grower cultivates plants in pots as a product to be sold and shipped to a second station, which is the retailer. In turn, the retailer sells the potted plant to a third station, namely an owner station, who either buys the plant or receives it as a gift, which is transported to destination by the retailer, the owner, or a third party.

For the grower, watering attendance is part of the production system and for and the retailer, watering belongs to the sales process. However, for the owner of a plant, watering attendance is a chore requiring care and skill, since excessive or too scarce watering may cause loss of the plant. Often, regular watering is problematical, especially when premises are left vacant for a longer period, or when the plant is placed exterior, for example, on a tomb in a graveyard where rain is scarce.

For a grower or for a retailer, self-watering devices intended to ease the watering chore for individual plants, are not practical. For an owner, self-watering planters are of partial help when they only supply liquid to the plant, but do not minimize the amount of liquid used, nor adapt that amount of liquid to the specific needs and nature of the plant in question.

Furthermore, available self-watering planters do not make use of commercially available items such as plant pots and liquid containers, but require custom made products, making self-watering planters quite expensive.

A solution to the above-mentioned disadvantages is achieved by providing a wetter, which is a unitary rigid plastic box containing at least one first conductor of wetness, releasably coupled via a bottom opening to the bottom of a pot. The pot is inserted into a container with the wetter in immersion into liquid, held in the container within a water level range, to conduct wetness to the plant.

With a grower, the container of liquid is probably of industrial size fitting numerous pots, and with an owner, an ornamental one adequate for one or a few single plants. A retailer will probably utilize either one or both, or an in-between. At any station, it is always sufficient to support the pot containing the plant above liquid level, so that the wetter dips into the liquid filled via an at least one opening in the container. When the pot is chosen to tightly fit the at least one opening in the container, evaporative losses of the container are prevented.

To facilitate transport of the pots, the wetters may be removed before shipment. At destination, the previously used wetters or different ones are connected to the pots, when required. It is thereby possible to accommodate the containers used by the grower, the retailer, and the owner, with different wetters of various length, color and type, suiting specific containers and needs.

Furthermore, if so desired, the potted plant may be grown by conventional watering attendance without the wetter, which is removed at will at any station of the life cycle. When wished, the situation is reversed after the wetter is reattached to the pot. A pot plug is available to plug the pot bottom opening, if required.

The wetter is configured to dose the amount of wetness transferred to the plant by both transferring wetness and controlling that amount of wetness to correspond to the needs of the specific plant. Use of the wetter does not impose restrictions but provides flexibility at all stations, for installation, removal, adaptation to a container, transfer to another pot, storage, or reuse.

SUMMARY

It is an object of the present invention to provide a method and an apparatus for plant attendance. Wetness is conveyed from a liquid contained in a reservoir to a medium wherein roots grow in substantially downward direction from a plant growing in substantially upward direction in a pot. The reservoir has a reservoir bottom from a periphery of which reservoir sidewalls rise to form a reservoir opening having a reservoir rim, and the reservoir is filled to a liquid level retained within a liquid level range. The pot has a pot bottom from a periphery of which pot sidewalls rise to form a pot top opening having a pot rim protruding laterally outward from the pot top opening. The pot is inserted through the reservoir opening and is supported therein. A wetter is coupled to the pot bottom, and has at least one lower conductor with a conductor lower end, the at least one lower conductor is configured for conveying an amount of wetness from the at least one lower conductor to the medium. More than one wetter may be coupled to one pot.

It is a further object of the present invention to provide an apparatus and a method comprising the steps of coupling the wetter to the pot bottom in removable reversible replacement, for configuring the wetter in support of the pot on the bottom of the reservoir, directly on the wetter itself, and for retaining the liquid level below the bottom of the pot. Thereby, plant attendance is turned from conventional watering attendance to plant wetting attendance.

It is another object of the present invention to provide an apparatus and a method wherein the wetter is reversibly removable from and replaceable in the pot bottom at a plant life cycle station selected from the group of stations consisting of grower stations, retailer stations, and owner stations, and wherein a pot plug is configured for reversible removable and replaceable plugging of the pot bottom when the wetter is removed from the pot. The plug is removable for returning the wetter to the pot, and the at least one lower conductor is made from a material selected from the group of materials consisting of ceramic fiber, ceramic wool, and ceramic felt. It is noted that the pot is supported in sealed coupling on either one of both the pot sidewalls and the pot rim It is yet a further object of the present invention to provide an apparatus and a method wherein the amount of wetness conveyed to the plant is dosed by aggregation in the wetter of at least one lower conductor and at least one controller disposed in tandem. Furthermore, the amount of wetness conveyed to the plant is dosed by aggregation in the wetter of at least one lower conductor disposed in tandem with at least one controller having a plurality of control bores, each control bore being configured for insertion therein of a control plug, and one or more of the plurality of control bores are appropriately plugged with a control plug, whereby wetness conveyed to the plant is controlled.

It is still an object of the present invention to provide an apparatus and a method wherein the wetter has at least one upper conductor filling an upper chamber, and an adjustable chamber filled with at least one lower conductor, for conveying the amount of wetness from the liquid to the plant via the at least one upper conductor and the at least one lower conductor. The adjustable chamber is accommodated for manual length adjustment, whereby flexibility is allowed when choosing a pot and a reservoir. When the pot is introduced in the interior of the reservoir, and disposed on the reservoir rim to close the reservoir opening by supporting either one of both the pot sidewalls and the pot rim, evaporative losses are minimized.

It is yet one more an object of the present invention to provide an apparatus and a method wherein the wetter has at least one wetness controller disposed above the at least one lower conductor for conveying wetness to both the at least one lower conductor and the medium. In addition, the wetter has at least one wetness controller is configured to permit adjustable regulation of wetness conveyed to the medium, whereby the amount of wetness conveyed to the medium is dosed by the at least one lower conductor and regulated by the at least one wetness controller.

It is an additional object of the present invention to provide an apparatus and a method wherein the wetter has at least one upper conductor disposed above the at least one lower conductor for conveying wetness to the medium. The wetter further has at least one wetness controller disposed intermediate and for conveying wetness to both the at least one lower conductor and the at least one upper conductor, and is configured to permit adjustable regulation of wetness conveyed to the medium. Thereby, wetness conveyed to the medium is dosed by both the at least one lower conductor and the at least one upper conductor, and regulated by the at least one wetness controller. Moreover, the reservoir has at least one drain opening configured as an outlet of liquid to prevent the liquid level from reaching the pot bottom.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Reference is made to FIGS. 1 to 5. As shown schematically in FIG. 1, a wetter I is releasably coupled to the underside of a pot II, which is supported by and inserted almost completely in the interior of a reservoir III. The pot II contains a plant P with roots R growing in a medium M. The reservoir III rests on a surface S and contains liquid L filled to a level LL. For proper functioning, at least a portion of the wetter I, protruding below the pot II, is submerged in the liquid L. More precisely, the liquid level LL must be kept above the free lower extremity of the wetter I, but below the bottom of the pot II.

Figure 1:
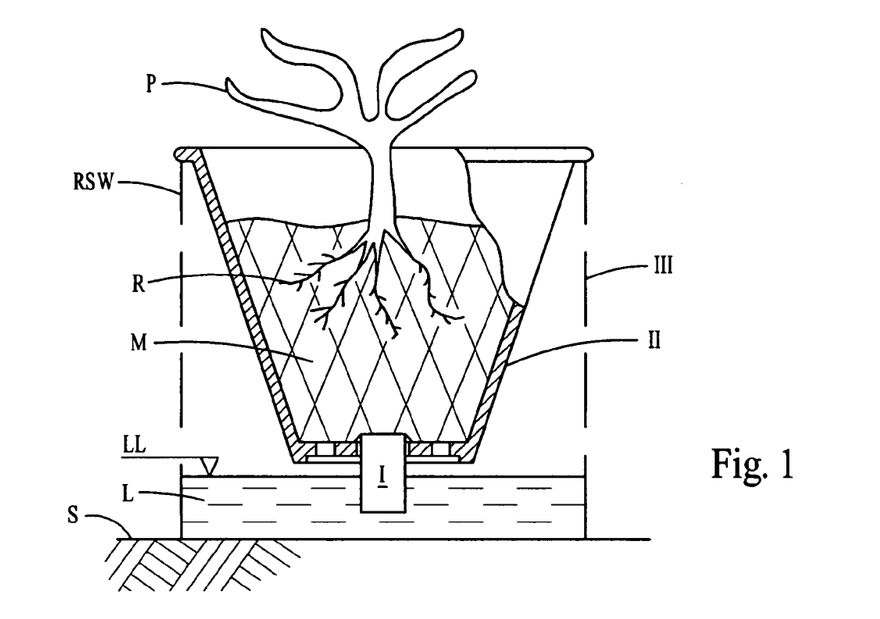
FIG. 1 is a schematic rendering of a wetter, a plant pot and a reservoir.

The wetter I, which is prone to various embodiments, is configured as a unitary rigid housing containing therein all the liquid conveying elements for providing wetness from the liquid L to the medium M. The wetter is easily manually connected and removable by hand from the pot II.

The reservoir sidewalls RSW of the reservoir III are shown schematically as dashed lines, since the shape of the reservoir at a potted plant production site, thus at a grower station, is different from an ornamental reservoir kept in a residence, at an owner station. A grower may want to support a large quantity of pots II in a kind of low-depth pool filled with liquid L. The pots II are then supported anywhere along their outer contour, as suitable to the grower, on legs, or on a trellis, or directly on the wetter I itself, although not shown in the Figs. In contrast, one decorative reservoir will probably contain but one plant P in a living room. Usually, one pot II requires one wetter I, but when the pot is a planter holding many plants P, more than one wetter is possibly needed.

For the sake of orientation, the general direction of growth of the plant P is defined as up, upper, upward, or top, and the opposite direction, in which the roots R generally grow, is defined as low, lower, down, downward or bottom.

Figure 2:
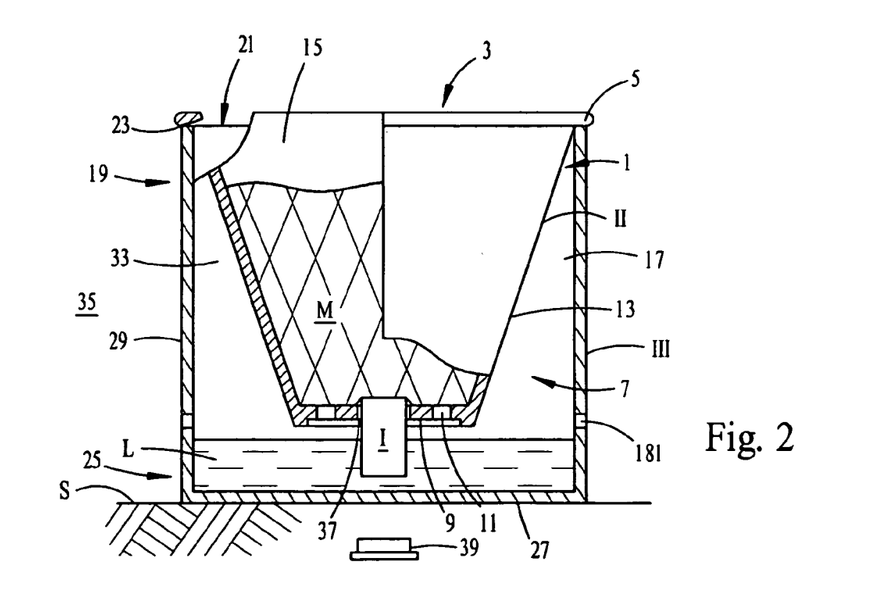
FIG. 2 illustrates a more detailed cross-section of a wetter coupled to a pot seated in a reservoir, according to FIG. 1.

FIG. 2 relating to the method for wetting plants P and to the plant wetting apparatus using a wetter I is shown as a partial cross-section of the wetter I, the pot II and the reservoir III, without the plant P. Similar reference numerals and characters refer to similar elements in the various figures.

A commonly available pot II such as shown in FIG. 2, has a pot upper portion 1 with a pot top opening 3 surrounded by a pot rim 5 extending laterally outward. A pot lower portion 7 contains a pot bottom 9, often pierced by pot bores 11. Pot sidewalls 13 rise upward, or slantingly upward, from the pot bottom 9 to form the pot top opening 3. The pot II further defines a pot interior 15 filled with medium M, and a pot exterior 17.

A commercially obtainable reservoir III, with a reservoir upper portion 19 and a reservoir opening 21, defines a reservoir rim 23 on which the pot rim 5 is seated. A reservoir lower portion 25 with a reservoir bottom 27, rests on a generally horizontal surface S. Reservoir sidewalls 29 rise upwardly from the reservoir bottom 27 to form the reservoir opening 21, which is covered by the pot II. The reservoir III defines a reservoir interior 33 filled with liquid L to a liquid level LL, and a reservoir exterior 35.

The pot II and the reservoir III may have various shapes and sizes, but an owner will probably prefer the to have the pot rim 5 in tight and sealing support over the reservoir rim 23. Such a configuration, with the pot II residing in the interior of the reservoir III has a lower profile, is more stable, and prevents evaporative losses of liquid L.

Still with reference to FIG. 2, the wetter I is seen coupled to the pot bottom 9. To this end, a pot bottom opening 37 is entered in the bottom of the pot II. A pot plug 39 may be used to plug the pot bottom opening 37 to prevent possible spillage of medium M, when the wetter I is not coupled to the pot II. The pot plug 39 is configured to fit the pot bottom opening 37 in manual releasable sealing engagement.

Figure 3:
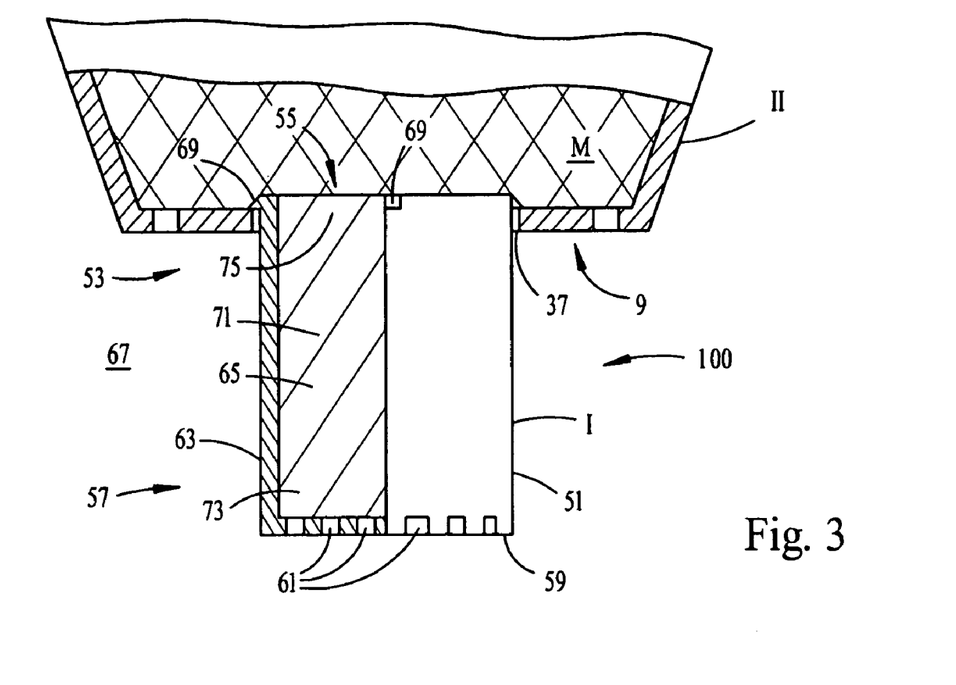
FIG. 3 shows a wetter according to a first embodiment 100.

A first embodiment 100 of the wetter I, is depicted in a partial longitudinal cross-section in FIG. 3, showing a unitary rigid beaker 51 of unitary rigid configuration with a beaker upper portion 53 and a beaker opening 55. A beaker lower portion 57 defines a beaker bottom 59, perforated by a plurality of bottom passages 61. From the periphery of the beaker bottom 59, beaker sidewalls 63 rise upward to form the beaker opening 55. The beaker 51 defines a beaker interior 65 configured to contain a lower conductor 71, and a beaker exterior 67.

It is on the beaker exterior 67 of the beaker opening 55 that releasable retaining connectors 69, such as snap-fits 69, in the shape of wedge protrusions, teeth, or flexible fingers, all well known to the art, slightly protrude in separated apart distribution, to releasably couple the beaker 51 to the pot bottom opening 37. When pushed in via the pot bottom opening 37 against the medium M residing in the pot interior. 15, the snap-fits 69 firmly catch the wetter I in releasable coupling to the pot bottom 9.

The lower conductor 71 is loaded a priori into the beaker 51 to fill the beaker interior 65, from the beaker bottom 59 to the beaker opening 55. Thereafter, the beaker upper portion 53 is introduced into the pot bottom opening 37 for releasable retention therein. The medium M thereby enters in abutting contact with the lower conductor 71, which is configured to draw from the container III a dosed amount of wetness necessary to optimally grow a plant P in the pot II, and to take maximum advantage of, and efficiently use, the amount of liquid L.

The pot II with the beaker 51 coupled thereto and containing the lower conductor 71 is lowered into the container III filled with liquid L up to a liquid level LL, to rest on the reservoir rim 23 shown in FIG. 2. The liquid level LL is brought to remain below the pot exterior 17, at highest just under the pot bottom 9, and at lowest, just above the beaker bottom 59. Wetness passage is established in conduction from the liquid L, via the plurality of bottom passages 61 piercing the beaker bottom 59 from the interior to the exterior, and via the lower conductor 71, to the medium M wherein the plant P grows.

The beaker 51 is preferably made from rigid plastic material and cylindrical, thus of circular cross-section, but cross-sections such as square, oval, polygonal or other geometrical shapes, are easily implemented. Evidently, the pot bottom opening 37 and the pot plug 39 must mutually conform to the beaker opening 55. The releasable retaining connectors 69 coupling the beaker 51 to the pot bottom opening 37 are designed to permit manual release and connection by longitudinal motion, side-twist, rotation or by any combination of easily operable movements of the hand.

The lower conductor 71 is introduced in the beaker 51 before coupling to the pot II. To properly convey wetness, the lower conductor 71 is chosen as a wetness absorbing material with communicating open pores, such as ceramic fiber. If desired ceramic wool or ceramic felt is selected, such as the material sold under the trademark name "Centiblanket", made by the Eurogar company of La Spezia, Italy, or as the French product sold by the trademark name of Ceramic Fiber Blanket.

For economic use of the wetness absorbing material, especially when the cross-section of the beaker 51 is circular, and for production efficiency reasons, rectangular strips of suitable size may be rolled-up tightly into cylindrical shape and introduced in alignment to fill the interior 65 of the beaker 51 from the beaker bottom 59 and up to the beaker opening 55. Likewise, to load beakers 51 with other than circular cross-section, wetness absorbing material is cut to pieces conforming to the cross-section of the beakers to be loaded and stacked in the beaker interior 65 from the beaker bottom 59 and up to the beaker opening 55. Rectangular strips of wetness absorbing material may be folded in zigzag fashion for beakers 51 of square and rectangular cross-section.

For use, there is need of a pot II to which the wetter I is releasably coupled. Together with the pot II, there is provided a pot plug 39, removable by hand, to close a ready-made pot bottom opening 37. Otherwise, a pot II is selected and a pot bottom opening 37 is cut out to conform with an available wetter I and a pot plug 37. The wetter I is thus coupled to a pot II, already filled with medium M and containing a plant P, or the wetter I is first coupled to the pot II, which is then filled with medium M into which a plant P is planted.

The pot II and wetter I are then lowered to securely rest into a reservoir III filled with liquid L. The liquid level LL is filled appropriately to not rise above the pot bottom 9 and to not descend below the beaker bottom 59. Thereby, at least a portion of the wetter I is submerged and so are the bottom passages 61. In other words, at least the bottom passages 61 must always be submerged.

A conductor lower end 73 of the lower conductor 71 abuts upon the bottom passages 61 on the interior of the beaker 51, and at the beaker opening 55, a conductor upper end 75 abuts upon the medium M contained in the pot II, to convey wetness from the liquid L retained in the reservoir III to the roots R of the plant P, via the medium M.

As a matter of convenience, although not shown in the Figs., the reservoir III is marked with a maximum and a minimum liquid level indicator, respectively MAX and MIN, for use when the water level is perceivable through the reservoir sidewalls 29 of the container III. When the reservoir sidewalls 29 are opaque, a window is possibly left transparent, marking maximum and minimum liquid level LL allowed. Otherwise, a liquid level gage, not shown in the Figs., is sunk into the liquid L on the pot exterior 17 or via the pot interior 15, through the top opening 3, the medium M and the pot bottom 9, to the liquid L, to report the height of the liquid level LL.

Before transport, or whenever desired, the reservoir III is separated from the pot II and so is the wetter I. If desired, the pot bottom opening 37 is plugged with the pot plug 39, and the plant P is further grown by conventional watering attendance. The situation may be reversed to return to plant wetting attendance by use of the wetter I and of the reservoir III.

Figure 4:
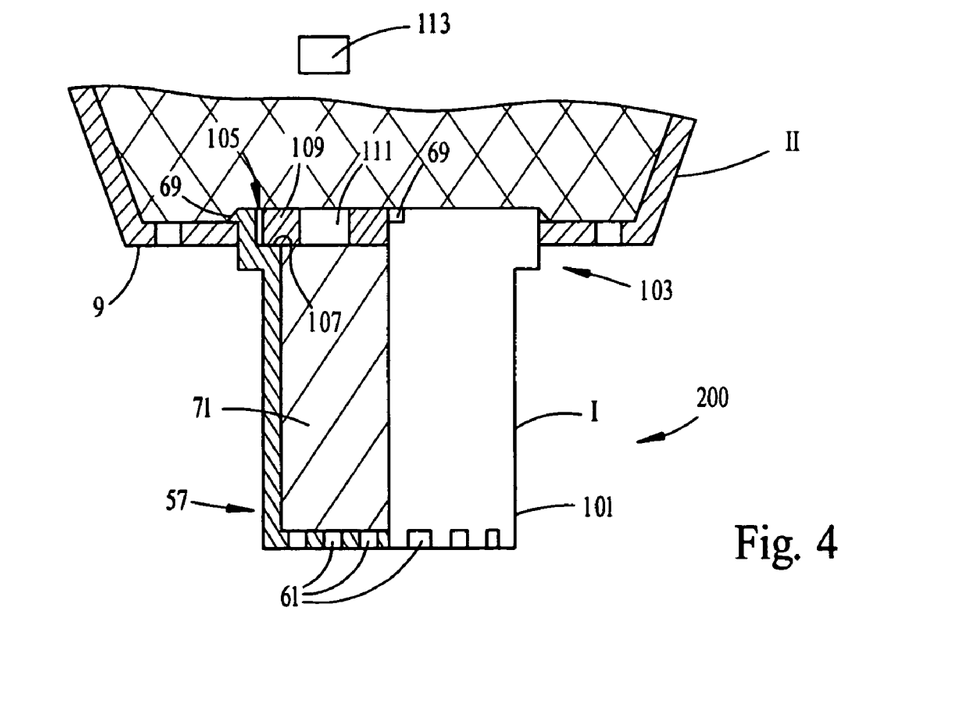
FIG. 4 presents a wetter according to a second embodiment 200.

A second embodiment 200 of the wetter I is seen in FIG. 4 as a shouldered beaker 101, different in nature from the embodiment 100 by featuring not only means for conveying wetness, such as a lower conductor 71, but also providing means for regulating the transfer of wetness.

The unitary rigid shouldered beaker 101 has a shouldered beaker lower portion identical to the beaker lower portion 57, and operates exactly as described above in relation with the first embodiment 100. However, a shouldered beaker upper portion 103 has a laterally enlarged shouldered beaker opening 105, but is equipped with the same releasable retaining connectors 69 for connection to the pot bottom 9. The transition between the shouldered beaker upper portion 103 and the beaker lower portion 57 creates a shoulder 107, perpendicular to the length of the shouldered beaker 101. This shoulder 107 is accommodated to support a controller 109.

The controller 109, which contains control bores 111, is brought to rest on the shoulder 107 to perform as a regulator of the wetness conveyed to the roots R. Control bores 111, four for example, are entered into the controller 109. Control plugs 113, made of impervious material, are configured for insertion into the control bores 111, whereby in one unpractical extreme, the amount of wetness conveyed to the plant P is totally blocked when all the control bores 111 are obstructed and in the opposite extreme, is unrestricted when all the control bores 111 are open. It is thereby possible by judicious plugging of one or more of the control bores 111, to control and effectively restrict the amount of conveyed wetness, to better match the needs of a plant P. Wetness is thus conveyed from the liquid L via the lower conductor 71 and through the controller 109 to the medium M.

The aggregation of both a wetness conveyor such as the lower conveyor 71 and of a regulator in the form of the controller 109 permits to finely dose the amount of wetness transferred to the plant P for the efficient use, and thus longer lasting of an amount of liquid L held in the reservoir III. Although it is possible to adapt the material of the lower conductor 71 to the type of plant P grown in the pot II, operational results are inferior by far in comparison with a conveyor and a regulator in tandem.

Figure 5:
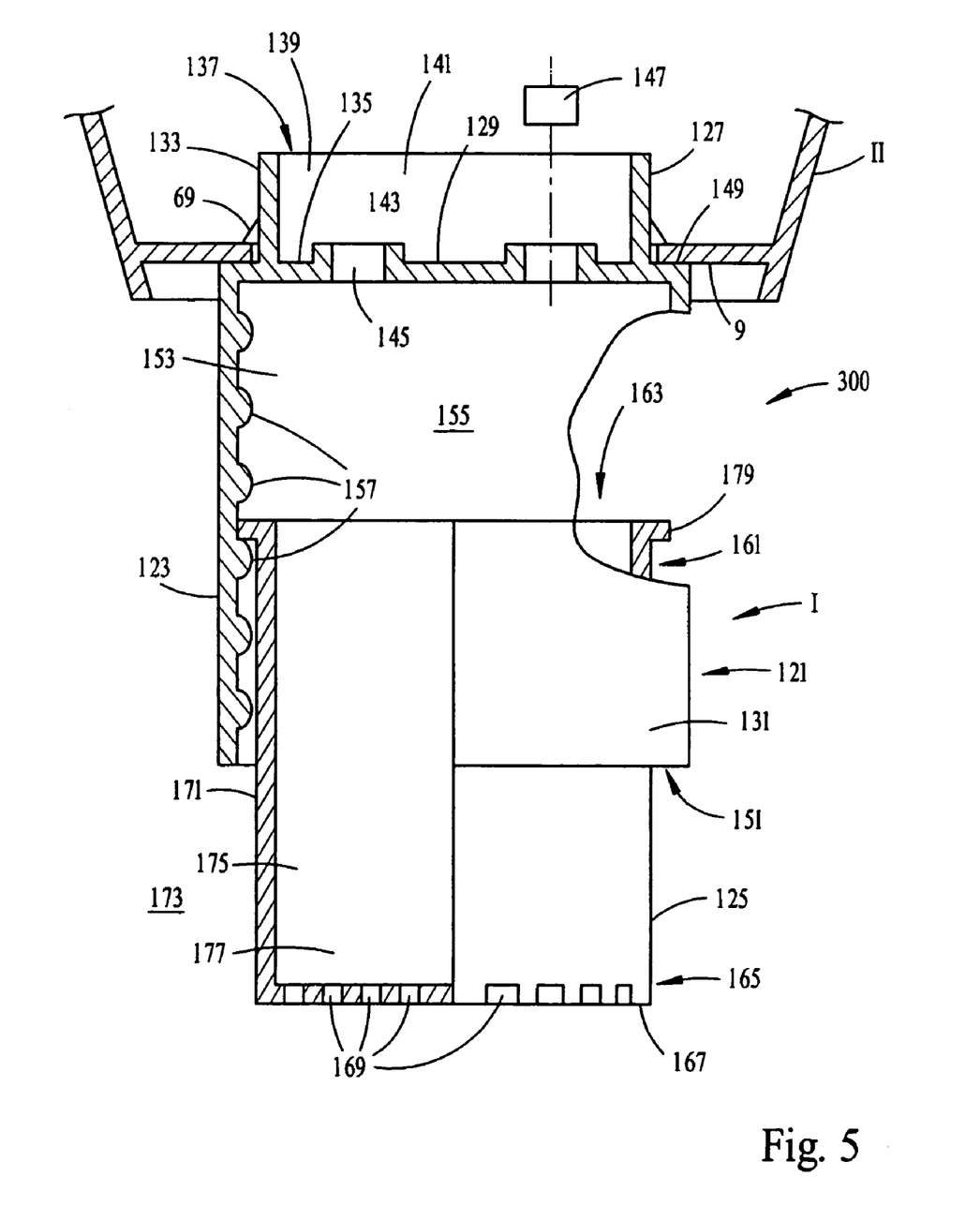
FIG. 5 depicts a wetter according to a third embodiment 300.

A third and preferred embodiment 300 of the wetter I is seen in FIG. 5 as a box 121, generally of cylindrical shape, similar in operation but different in structure from the embodiment 200. The unitary rigid box 121 is adjustable in length, and has an interior able to contain a load of independent wetness conveyance and control elements, in series. As described above regarding embodiment 100, the box 121 may have other than a circular cross-section.

With reference to FIG. 5, the box 121 is structured as a couple of mutually aligned components, which are a cover 123 atop, receiving a cup 125 in engagement thereunder. The cover 123 further provides a receptacle 127 located above a partition 129 in intermediate separation between the receptacle 127 above and a skirt 131 below. For practical purposes, the box 121 is realized from plastic material, by injection molding or otherwise.

The receptacle 127 is formed by circular receptacle sidewalls 133 rising vertically above the partition 129, forming a receptacle bottom 135 and defining a receptacle open aperture 137, at the top of the cover 123. A receptacle interior 139, delimited by the receptacle bottom 135, the receptacle sidewalls 133 and the receptacle aperture 137, defines an upper chamber 141 intended for containing an upper wetness conveyor, or upper conductor 143, when desired.

The receptacle bottom 135 is pierced throughout from side to side by control bores 145, plugged by control plugs 147 when desired, to become a wetness conveyance regulation element, alike the controller 109 of embodiment 200. Preferably, four control bores 145 are entered into the receptacle bottom 135. A single bore 145 is purposeless, but any other practical number of bores 145 is possible.

The partition 129 extends laterally outward and around the receptacle sidewalls 133 to form an annular shoulder 149. On the exterior of the receptacle sidewalls 133 and at an appropriate distance above the annular shoulder 149, releasable connectors 69, are attached in separated distribution, spaced equally apart or not, to releasably couple the cover 123 to the pot II, as described in detail above. Preferably, three or four releasable retaining connectors 69, such as snap-fits 69 are provided at sufficient distanced above the annular shoulder 149 to permit easy releasable coupling to the pot bottom opening 37. The releasable retaining connectors 69 coupling the wetter 121 to the pot bottom 9 are designed to permit manual release and connection by longitudinal motion, side-twist, rotation or by any combination of easily operable movements of the hand.

Unlike the embodiments 100 and 200, penetration of the cover 123 to the interior of the pot II is thus prevented by the annular shoulder 149, but release of the box 121 from the pot II is achieved manually. As described above, a pot plug 39 is provided to plug the pot opening 37 when the box 121 is removed.

The cover 123 also has skirt sidewalls 131 that descend vertically down from the periphery of the annular shoulder 149 to define a downward facing skirt opening 151 intended for receiving the cup 125 therein. The interior of the skirt 131 defines a skirt upper volume 153 forming one portion of an adjustable chamber 155. For the sake of lengthwise adjustment of the volume of the adjustable chamber 155, some skirt protrusions 157 are provided in appropriate distribution on the interior of the skirt sidewalls 131, as described below.

The cup 125 is almost identical to the beaker 51 of embodiment 100, but for the exterior of the beaker upper portion 53. As seen in FIG. 5, the cylindrical cup 125 has a cup upper portion 161 accommodating a cup opening 163. A cup lower portion 165 defines a cup bottom 167 from the periphery of which cup sidewalls 171 rise upward to form the cup opening 163. The cup bottom 167 is perforated by a plurality of bottom passages 169, providing passage through the thickness of the bottom to the underside and to the side of the cup bottom 167.

The cup 125 has a cup exterior 173 and a cup interior 175, which is delimited by the cup opening 163, the cup bottom 167, and the cup sidewalls 171. The cup interior defines a cup lower volume 177. It is on the cup exterior 173 of the cup opening 163 that a cup lip 179 protrudes as a circumferential rim of shallow height, provided for adjustable engagement with the skirt protrusions 157.

When the cup opening 163 is received in the interior of the skirt opening 151, the cup lip 179 may be forced into the interior over the protrusions 157 located on the interior of the cup sidewalls 171. The protrusions 157 are distributed along the interior of the cup sidewalls 171 to permit the selection of different depths of insertion of the cup 125 into the skirt upper volume 153. The more the cup 125 in forced into the interior of the skirt 131 the smaller becomes the volume of the adjustable chamber 155 defined as the sum of the volumes of the skirt upper volume 153 and of the cup lower volume 177, and the shorter the overall length of the box 121. In this case, the length of the box 121 is defined as the distance from the annular shoulder 149 to the cup bottom 167.

This arrangement of protrusions 157 and cup lip 179 permits manual longitudinal adjustment of the length of the box 121 allowing flexibility when accommodating the choice of a pot II and of a reservoir III. Nevertheless, the box 121 remains strong and sturdy and once the length of the box is adjusted, it remains fixed. That length is not prone to change under slight pull or push, but two hands are needed to slide the cover 123 over or from the cup 125. The length of the box 121 is thus adaptable to various kinds and various sizes of pots II and reservoirs III, selected for mutual use.

In use, when a retailer sells the plant wetting apparatus to a prospective owner, this last one selects a plants P in a pot II, and one of the various types of reservoirs III, shown on display. It is further assumed that the pot II has a pot bottom 9 with a pot bottom opening 37 closed by a pot plug 39, or that a bottom opening 37 is cut in the pot bottom 9, in conformance with a box 121 and with a pot plug 39.

Once the pot II and the reservoir III are selected, then the distance between the pot bottom 9 and the reservoir bottom 27 is known. The maximum length of the box 121 is now determined by adjusting the depth of penetration of the cup 125 into the skirt 131 of the cover 123, which length determination permits to cut to size, or to select, the lower conductor 71, not shown in FIG. 5.

The material from which the lower conductor 71 is implemented is selected and loaded into the box 121 as described in detail above, with reference to the embodiment 100. First, the lower conductor 71 is sled into the cup 125 with the conductor upper end 75 protruding to the exterior of the cup interior 175. Thereby, the lower conductor 71 accommodates the previously determined length of the box 121, to fill the whole volume of the adjustable chamber 155. The skirt 131 is now closed over the cup 125 for the conductor lower end 73 to abut upon the cup bottom 167, and for the conductor upper end 75 to abut upon the partition 129.

Possibly, the lower conductor 71 is made of one or more materials and performs both as a conductor and as a regulator of wetness. According to the plant P that was selected, none, or one or more control plugs 147 are inserted into the control bores 145. At least one control bore 145 must remain open to allow conveyance of wetness.

As an alternative to the combination of control bores 145 and control plugs 147, other wetness passage control mechanisms may be implemented. For example, a thin disk of impervious material, not shown in the Figs., with an appropriately selected distribution of disk bores, is rested over the control bores 145. To control the passage of wetness, the disk is simply rotated to allow less or more alignment of the disk bores with the control bores 145. When the disk bores are fully aligned with the control bores 145, free passage of wetness is obviously permitted.

In turn, and still according to the selected plant P, an upper conductor 143 is disposed in the interior of the receptacle 127. Again, one or more materials may be chosen to operate both as a conductor and as a regulator of wetness. The upper conductor 143 is for example, earth, sand, saw dust, ash, or granules, powder, alone and in combination, that propagate wetness. Sometimes, particles of impervious material such as chips or granules of plastics material waste are added to reduce the area of wetness transfer.

The upper conductor 143 is inserted to completely fill the upper chamber 141, thus to fill the open control bores 145 as well as the receptacle 127 from the receptacle aperture 137 to the receptacle bottom 135. Optionally, the upper conductor 143 is implemented with the same material as the wetness conductor 71.

The box 121 is now ready for coupling to the pot II. The pot plug 39 is removed from the pot bottom opening 37 to insert the receptacle 127 therethrough for penetration into the medium M. Alternatively, as described above, a bottom opening 37 is cut in the bottom 9 of the pot II. The receptacle 127 is thus manually forced into the medium M in abutment, thus in good mutual contact, to ensure wetness transfer from the upper conductor 143 to the medium M. The box 121 is then securely but releasably coupled to the pot II, by help of the releasable retention connectors 69, or by any other releasable mechanism known to the art, as described above in relation with the embodiment 100.

Once the box 121 is securely but releasably coupled to the pot II, this last one is lowered into the reservoir III previously filled with an appropriate amount of liquid L.

In operation, the box 121 is loaded with at least one lower conductor 71, and at least one upper conductor 143, and at least one controller 109, with control plugs 147 adjusted as desired. The box 121 is coupled to the pot bottom 9 after removal of the pot plug 39. The pot II, which contains a plant P growing in the medium M is lowered into the reservoir III via the reservoir opening 21, into which liquid L was filled to an appropriate liquid level LL. The liquid level LL is filled to reach at least above the cup bottom 167, and at most just below the pot below the pot bottom 9. The lower conductor 71 which dips into the liquid L, transfers, or conveys wetness to the at least one upper conductor 143 via the at least one wetness controller 109, from where wetness is conveyed to the medium M.

It is noted that the box 121 provides flexibility not only in longitudinal adjustment but also in wetness conveyance and control, by operating as one of the embodiment 100, 200, and evidently as the embodiment 300 described above. For example, similar to the embodiment 100, only a lower conductor 71 is inserted in the adjustable chamber 155, but the receptacle 127 and the control bores 145 are filled with medium M. Likewise, to perform as the embodiment 200, a lower conductor 71 is inserted in the adjustable chamber 155, and the control bores 145 are plugged as needed with control plugs 147, while the receptacle is loaded with medium M.

When the pot II is sealingly supported by the reservoir rim 23 of the reservoir III, either on the pot rim 5 or on the pot sidewalls 13, evaporative losses of liquid from the reservoir III are practically eliminated. Nevertheless, when replenishment is required, the pot II is lifted slightly out of the reservoir III and liquid L is added into the reservoir III via the pot top opening 3. As an option, the reservoir III may contain an additional opening, not shown in the Figs., through which liquid L is added when needed, and thereafter, the additional opening is adequately plugged.

For the wetter I to operate, the liquid level LL may not drop below the cup bottom 167, and should better stay below the pot bottom 9. To facilitate tracking of the liquid level LL in the reservoir III, and as explained above in relation with the embodiment 100, the reservoir sidewalls 29 are marked with minimum and maximum lines, or a window is provided, or a liquid level LL gage is inserted.

When the wetter I is kept exterior, thus in the open, either by a private owner or by a grower, rain may fill the reservoir III via the medium M and the wetter I for the liquid level LL to rise above the pot bottom 9. To prevent flooding of the medium M, drain openings 181 are accommodated in the reservoir sidewalls 29. Thus, at least one drain opening is provided in the reservoir for outlet of liquid to prevent the liquid level LL to rise above the pot bottom 9.

With a plant grower, the reservoir III may contain a plurality of pots II with their wetters I. The pots II are possibly supported anywhere along the pot sidewalls 13 and even seated on the 167. It is noted that the bottom passages 169 extend through the periphery of the cup bottom 167 to allow wetness passage even if the cup bottom 167 rests on the bottom of a reservoir.

The box 121 thus constitutes a single autonomous physical entity coupling between the reservoir III and the pot II, to transfer wetness from the liquid L to the medium M. A wetter I, such as the box 121, is easily connected and removed from the pot II. When coupled to the pot II, in a first mode, the box 121 if fit for plant wetting attendance of the plant P, and when the box 121 is removed, in a second mode, the plant P returns to conventional watering attendance. The process of passing from plant attendance first mode to plant attendance second mode is reversible, and operative vice versa.

During the life cycle of potted plants, the box 121 may be removed from and replaced into the pot II many times and at any of the stations of the production chain. Sometimes, a wetter I is removed from one pot II for insertion into another pot, for example when a plant dies and there is no use for the wetter, or before a pot II is shipped, or when an owner prefers conventional watering, etc. In the same way, a wetter I is coupled to a pot II when a pot II is delivered, or at the request of an owner, or when a plant P is planted in a pot II.

Year-long experiments with the wetter I as the box 121, with various plants P and under various plant P growing conditions, have provide better than expected results. The box 121 has proven proficient to dose the liquid L available to provide long time support of potted plants P. The amount of liquid conveyed by the box I demonstrated efficiency with respect to wetness transfer and wetness control. Typical dimensions for the cup 125 are a diameter of five to six cm, cup sidewalls 171 some 4 to 6 cm high, and a cup bottom 167 pierced like a sieve with approximately 40 to 80 bottom passages 169. The cover has receptacle sidewalls 133 about 1.5 to 2.5 cm high, a skirt 131 from 4 to 6 cm long, and control bores 145 of about 1 cm of diameter.

It will be appreciated by persons skilled in the art, that the present invention is not limited to what has been particularly shown and described hereinabove. For example, a plant P may be fitted with different wetters I according to the season of the year, especially when growing exterior, in the open. Furthermore, the reservoir III is not necessarily supported on a surface S resting on the ground, but may be suspended. Rather, is the scope of the present invention is defined by the appended claims and includes both combinations and sub-combinations of the various features described hereinabove as well as variations and modifications thereof which would occur to persons skilled in the art upon reading the foregoing description.

INDUSTRIAL APPLICABILITY

The wetter I is applicable to industrial mass-production and to the potted plant industry.

What is claimed is:

1. An apparatus for plant attendance conveying wetness from a liquid contained in a reservoir to a medium wherein roots grow in a substantially downward direction from a plant growing in a substantially upward direction from a pot, wherein:
   in the reservoir:
   a reservoir bottom from a periphery of which reservoir sidewalls rise to form a reservoir opening having a reservoir rim, the reservoir being filled to a liquid level retained within a liquid level range,
   in the pot:
   a pot bottom from a periphery of which pot sidewalls rise to form a pot top opening having a pot rim protruding laterally outward from the pot top opening, the pot being inserted through the reservoir opening and supported therein, and
   a wetter coupled to the pot bottom, and having at least one lower conductor with a conductor lower end, the at least one lower conductor conveying wetness from the at least one lower conductor to the medium,
   wherein:
   the wetter is coupled in removable reversible replacement to the pot bottom, and is configured for support of the pot on the bottom of the reservoir, directly on the wetter itself, and
   the liquid level is retained below the bottom of the pot, the apparatus comprising:
the wetter being configured to have mutually aligned components including a cover atop receiving a cup in engagement thereunder, wherein:
the cup has a bottom pierced by a plurality of bottom passages,
the cover provides a receptacle disposed above a partition in intermediary separation between the receptacle above and a skirt below,
the receptacle is formed as an upper chamber for receiving at least one upper wetness conductor, and
the partition forms a receptacle bottom which is pierced throughout from side to side by control bores,
whereby plant attendance is turned from conventional watering attendance to plant wetting attendance, and
whereby the at least one lower conductor conveys wetness from the reservoir to the medium via the plurality of bottom passages, the at least one lower wetness conductor, the control bores, and the at least one upper wetness conductor.

2. The apparatus according to claim 1, wherein:
the at least one lower conductor is made from a material selected from the group of materials consisting of ceramic fiber, ceramic wool, and ceramic felt.

3. The apparatus according to claim 1, wherein:
the amount of wetness conveyed to the plant is dosed by aggregation in the wetter of a plurality off bottom passages, the at least one lower conductor, control bores, and at least one upper conductor disposed in tandem.

4. The apparatus according to claim 1, wherein:
the amount of wetness conveyed to the plant is dosed by aggregation in the wetter of a plurality of bottom passages, the at least one lower conductor disposed in tandem with at least one upper conductor, and a controller having a plurality of control bores, which are configured for insertion therein of a control plug, and
the amount of wetness conveyed to the plant is controlled by appropriately plugging one or more of the plurality of control bores with a control plug.

5. The apparatus according to claim 1, wherein:
the skirt is operatively coupled with the cup to form an adjustable chamber configured for the manual adjustment of the length of the box, and
the wetter has at least one upper conductor filling the receptacle, and the adjustable chamber is filled with the at least one lower conductor, for conveying an amount of wetness from the liquid to the plant via the at least one upper conductor and the at least one lower conductor.

6. The apparatus according to claim 1, wherein:
the skirt is operatively coupled with the cup to form an adjustable chamber configured for the manual adjustment of the length of the box, and
the wetter has at least one upper conductor filling the receptacle and the adjustable chamber is filled with the at least one lower conductor, for conveying wetness from the liquid to the plant via the at least one upper conductor and the at least one lower conductor, and
the adjustable chamber permits manual length adjustment of the box, thereby allowing flexibility when choosing to accommodate a pot and a reservoir selected for mutual use.

7. The apparatus according to claim 1, wherein:
the wetter has at least one wetness controller disposed in the receptacle intermediate the at least one lower and the at least one upper conductor, the at least one wetness controller being configured with the control bores to permit adjustable regulation of the amount of wetness conveyed to the medium by appropriate plugging of a control bore with a control plug,
whereby the amount of wetness conveyed to the medium is dosed by the at least one lower conductor and regulated by the at least one wetness controller.

8. The apparatus according to claim 1, wherein:
at least one upper conductor is disposed in the interior of the wetter in a receptacle disposed above the at least one lower conductor for conveying wetness to the medium, and
at least one wetness controller is disposed in the interior of the wetter intermediate the receptacle above and the skirt below, and in wetness conveyance with both the at least one lower conductor and the at least one upper conductor, for permitting adjustable regulation of the amount of wetness conveyed to the medium by appropriate plugging of a control bore with a control plug,
whereby the amount of wetness conveyed to the medium is dosed by both the at least one lower conductor and the at least one upper conductor, and regulated by the at least one wetness controller.

9. The apparatus according to claim 1, wherein:
the skirt is operatively coupled with the cup to form an adjustable chamber configured for the manual adjustment of the length of the box,
whereby the wetter is adjustable in length to match selected combinations of pot and reservoir.

10. The apparatus according to claim 1, wherein:
the reservoir has at least one drain opening provided in the sidewalls of the reservoir as an outlet of liquid to prevent both flooding of the medium by rain and rising of the liquid level above the pot bottom.

11. A method for plant attendance conveying wetness from a liquid contained in a reservoir to a medium wherein roots grow in a substantially downward direction from a plant growing in a substantially upward direction in a pot, wherein:
in the reservoir:
a reservoir bottom from a periphery of which reservoir sidewalls rise to form a reservoir opening having a reservoir rim, the reservoir being filled to a liquid level,
in the pot:
a pot bottom from a periphery of which pot sidewalls rise to form a pot top opening having a pot rim protruding laterally outward from the pot top opening, the pot being inserted through the reservoir opening and supported therein, and
a wetter coupled to the pot bottom, and having at least one lower conductor with a conductor lower end, the at least one lower conductor conveying wetness from the at least one lower conductor to the medium,
wherein:
the wetter is coupled to the pot bottom in removable reversible replacement,
the wetter is configured for support of the pot on the bottom of the reservoir, directly on the wetter itself, and
the liquid level is retained below the bottom of the pot, the method comprising the steps of:
configuring the wetter to have mutually aligned components including a cover receiving a cup in engagement thereunder,
wherein:
the cup has a bottom pierced by a plurality of bottom passages,
the cover provides a receptacle disposed above a partition in intermediary separation between the receptacle above and a skirt below,
the receptacle is formed as an upper chamber for receiving at least one upper wetness conductor, and
the partition forms a receptacle bottom which is pierced throughout from side to side by control bores,
whereby plant attendance is turned from conventional watering attendance to plant wetting attendance, and
whereby the at least one lower conductor conveys wetness from the reservoir to the medium via the plurality of bottom passages, the at least one lower wetness conductor, the control bores, and the at least one upper wetness conductor.

12. The method according to claim 11, wherein:
the at least one lower conductor is made from a material selected from the group of materials consisting of ceramic fiber, ceramic wool, and ceramic felt.

13. The method according to claim 11, wherein:
wetness conveyed to the plant is dosed by aggregation in the wetter of a plurality of bottom passages, at least one lower conductor, control bores, and at least one upper conductor disposed in tandem.

14. The method according to claim 11, wherein:
wetness conveyed to the plant is dosed by aggregation in the wetter of a plurality of bottom passages, with the at least one lower conductor being disposed in tandem with at least one upper conductor, and a controller intermediate with the at least one lower and upper conductors, the controller having a plurality of control bores, each control bore being configured for insertion therein of a control plug, and
one or more of the plurality of control bores are appropriately plugged with a control plug, whereby wetness conveyed to the plant is controlled.

15. The method according to claim 11, wherein:
the skirt is operatively coupled with the cup to form an adjustable chamber configured for the manual adjustment of the length of the box, and
the wetter has at least one upper conductor filling the receptacle, and the adjustable chamber is filled with at least one lower conductor, for conveying wetness from the liquid to the plant via the at least one upper conductor and the at least one lower conductor.

16. The method according to claim 11, wherein:
the skirt is operatively coupled with the cup to form an adjustable chamber configured for the manual adjustment of the length of the box, and
the wetter has at least one upper conductor filling the receptacle and the adjustable chamber is filled with the at least one lower conductor, for conveying wetness from the liquid to the plant via the at least one upper conductor and the at least one lower conductor, and
the adjustable chamber is accommodated for manual length adjustment, to adapt the length of the box to various sizes of pots and of reservoirs selected for mutual use,
whereby flexibility is allowed when choosing a pot and a reservoir.

17. The method according to claim 11, wherein:
the wetter has at least one upper conductor disposed in the receptacle above the at least one lower conductor and the partition with the control bores, for conveying wetness to both the at least one lower conductor and the medium,
whereby wetness conveyed to the medium is dosed by the at least one lower conductor, by the partition, and further dosed by the at least one upper conductor.

18. The method according to claim 11, wherein:
the wetter has at least one wetness controller disposed in the receptacle above the at least one lower conductor for conveying wetness to both the at least one lower conductor and the medium, and
the at least one wetness controller is configured to permit adjustable regulation of wetness conveyed to the medium by control bore plug insertion,
whereby wetness conveyed to the medium is dosed by the at least one lower conductor and regulated by the at least one wetness controller.

19. The method according to claim 11, wherein:
the wetter has at least one upper conductor disposed in the receptacle above the at least one lower conductor for conveying wetness to the medium,
the wetter further has at least one wetness controller disposed intermediate and for conveying wetness to both the at least one lower conductor and the at least one upper conductor, and
the at least one wetness controller is configured to permit adjustable regulation of wetness conveyed to the medium by control bore plug insertion,
whereby wetness conveyed to the medium is dosed by both the at least one lower conductor and the at least one upper conductor, and regulated by the at least one wetness controller.

20. The method according to claim 11, wherein:
the reservoir has at least one drain opening configured as an outlet of liquid to prevent the liquid level from reaching the pot bottom.

* * * * *